(12) United States Patent
Kato et al.

(10) Patent No.: US 7,178,919 B2
(45) Date of Patent: Feb. 20, 2007

(54) PLASTIC LENS FOR SPECTACLES

(75) Inventors: Yuji Kato, Okazaki (JP); Naoyuki Ishii, Okazaki (JP); Kaname Hase, Okazaki (JP)

(73) Assignee: Tokai Kogaku Co., Ltd. (JP)

( * ) Notice: Subject to any disclaimer, the term of this patent is extended or adjusted under 35 U.S.C. 154(b) by 42 days.

(21) Appl. No.: 11/039,261

(22) Filed: Jan. 18, 2005

(65) Prior Publication Data

US 2006/0158747 A1    Jul. 20, 2006

(51) Int. Cl.
    *G02C 7/02*    (2006.01)
(52) U.S. Cl. .................................... 351/166
(58) Field of Classification Search ........... 359/741, 359/580, 581; 351/166
    See application file for complete search history.

(56) References Cited

U.S. PATENT DOCUMENTS

| 6,296,793 | B1 * | 10/2001 | Anthes et al. | 264/104 |
| 6,929,822 | B2 * | 8/2005 | Kono | 359/580 |
| 2003/0181044 | A1 * | 9/2003 | Takahashi et al. | 438/689 |
| 2005/0196616 | A1 * | 9/2005 | Stewart et al. | 428/412 |

OTHER PUBLICATIONS

Abstract of Japanese Patent Publication No. 63214701 Pub. Date: Sep. 7, 1988, Patent Abstracts of Japan.
Abstract of Japanese Patent Publication No. 63293502, Pub. Date: Nov. 30, 1988, Patent Abstracts of Japan.
Abstract of Japanese Patent Publication No. 05215905 Pub. Date: Aug. 27, 1993, Patent Abstracts of Japan.
Abstract of Japanese Patent Publication No. 09113852, Pub. Date: May 2, 1997, Patent Abstracts of Japan.
Abstract of Japanese Patent Publication No. 09157582, Pub. Date: Jun. 17, 1997, Patent Abstracts of Japan.
Abstract of Japanese Patent Publication No. 2001-228302 Pub. Date: Aug. 24, 2001, Patent Abstracts of Japan.
Abstract of Japanese Patent Publication No. 2001-358495 Pub. Date: Dec. 26, 2001, Patent Abstracts of Japan.
Abstract of Japanese Patent Publication No. 2002-148402 Pub. Date: May 22, 2002, Patent Abstracts of Japan.

* cited by examiner

*Primary Examiner*—Alicia Harrington
(74) *Attorney, Agent, or Firm*—Martine Penilla & Gencarella, LLP

(57) ABSTRACT

A plastic lens of a multilayer film structure forms an organosiloxane-based hard coating film formed on a surface of a lens substrate as a first layer, an inorganic oxide-based antireflection film formed on the hard coating film as a second layer, and a water-repellent thin film obtained by polycondensing an organosilicon compound and formed on the antireflection film as a third layer, pencil hardness of the surface of the lens on which these plural layer films are formed being from 3H to 7H, and an initial falling angle of oleic acid on the surface of the lens on which these plural layer films are formed being 20° or less.

19 Claims, No Drawings

PLASTIC LENS FOR SPECTACLES

FIELD OF THE INVENITON

The present invention relates to a plastic lens for spectacles.

DESCRIPTION OF THE RELATED ART

Plastic lenses for spectacles have advantageous characteristics that they are lightweight, hard to break and easy to dye, and these characteristics are not found in glass lenses. In the past, there were defects that a reflective index is low or deterioration with age tends to occur in comparison to glass lenses. However, plastic lenses per se have been improved, and materials of plastic lenses having qualities equal to those of glass lenses have been currently developed.

Although optical characteristics of lenses are improved, plastic lenses tend to be indeed more damaged than glass lenses owing to characteristics of plastic materials. Accordingly, a hard coating film has been so far used in plastic lenses for improving scratch resistance of a lens surface.

An antireflection film is generally coated on a lens. The antireflection film is applied to an upper layer of the hard coating film. However, a general antireflection film is a monolayer film or a multilayer film comprising $TiO_2$, $SiO_2$ or the like, and dirt has been easily adhered to the surface of the antireflection film made of these materials.

Therefore, in order to prevent adhesion of dirt to the antireflection film, there is a technique that a hard film is coated on an upper layer thereof. This technique is disclosed in, for example, JP-B-7-113682 (page 2, FIG. 1). However, the hard film is not necessarily good. When the film is too hard, it might rather be peeled by a mere scratch. Accordingly, in a thin film for protecting such an antireflection film, optimum conditions as a plastic lens for spectacles have to be determined.

The invention has been made upon focussing on such problems associated with the related art. It aims to provide a plastic lens for spectacles to which an optimum thin film coating for protecting an antireflection film is applied.

DISCLOSURE OF THE INVENTION

For solving the foregoing problems, the invention provides a plastic lens of a multilayer film structure comprising an organosiloxane-based hard coating film formed on a surface of a lens substrate as a first layer, an inorganic oxide-based antireflection film formed on the hard coating film as a second layer, and a water-repellent thin film obtained by polycondensing an organosilicon compound and formed on the antireflection film as a third layer, pencil hardness of the surface of the lens on which these plural layer films are formed being from 3H to 7H, and an initial falling angle of oleic acid on the surface of the lens on which these plural layer films are formed being 20° or less.

Here Plastics constituting the plastic lens in the invention is not particularly limited, and any commercial base material for spectacles can be used. For example, a transparent plastic lens of diethylene glycol bisallyl carbonate (CR-39), polycarbonate or the like can be mentioned. Examples of a plastics having a high refractive index can include a polyurethane resin obtained by addition-polymerizing a polyisocyanate compound with a polythiol and/or a sulfur-containing polyol and an episulfide resin obtained by addition-polymerizing an episulfide group with a polythiol and/or a sulfur-containing polyol.

Of these base materials having various refractive indexes, a material having a refractive index of 1.57 or more is especially preferable. For example, a polyurethane resin and an episulfide resin having refractive indexes of 1.60 and 1.70 respectively are preferable.

The hard coating film as the first layer comprises an organosiloxane resin and inorganic oxide fine particles. The hard coating film is formed by dipping in a hard coating solution for coating and then evaporating a solvent in a known manner. The hard coating solution is a mixed solution of water or an alcohol solvent, an organosiloxane resin and an inorganic oxide fine particle sol.

The organosiloxane resin is preferably obtained by heat-curing an alkoxysilane hydrolyzate. Specific examples of the alkoxysilane include γ-glycidoxypropyltrimethoxysilane, γ-glycidoxypropyltriethoxysilane, methyltriethoxysilane, ethyl silicate and the like. These alkoxysilane hydrolyzates are produced by hydrolyzing the alkoxysilane compounds singly or in combination of two or more with an acid aqueous solution such as hydrochloric acid.

Specific examples of the inorganic oxide fine particles include sols of zinc oxide, silicon dioxide, aluminum oxide, titanium oxide, zirconium oxide, tin oxide, beryllium oxide, antimony oxide, tungsten oxide, cerium oxide and the like, and these may be used either singly or as a mixed crystal of two or more thereof. As a composite sol of two or more thereof, for example, a composite sol of tin oxide and tungsten oxide is mentioned. A size of metallic particles is important because it is related with transparency of a hard coating film. The metallic particle size has to be 100 nm or less, and a size of from 1 to 50 nm is especially preferable. A mixing amount of metallic particles greatly influences hardness and toughness of the hard coating film. It is preferable that the mixing amount is from 40 to 60% by weight based on the hard coating components.

A curing catalyst such as an acetylacetone metal salt or an ethylenediaminetetraacetic acid metal salt may be added to the hard coating solution as required. Further, the hard coating solution may be formed by adding a surfactant, a colorant, a solvent and the like as required. An ultraviolet absorber is added to the resin constituting the hard coating film, which makes it possible to prevent deterioration of resins constituting a lens body, a primer and a hard coating and to protect eye-balls.

A film thickness of the hard coating film is preferably from 0.5 to 2.5 μm, more preferably from 1.0 to 2.0 μm. The reason for making the film thickness 0.5 μm or more is that when the film thickness is much reduced, an effect of preventing an interference fringe can be expected, but when it is too much reduced, an effect of marring resistance of a lens cannot be exhibited. Meanwhile, it is preferable that the upper limit of the film thickness is set at 2.5 μm in order to avoid such problems of properties that hardness is easily increased but cracking of a lens body tends to occur and it becomes brittle.

A refractive index of the hard coating film has to be selected depending on a refractive index of a base material. A refractive index varies with a mixing amount or a mixing ratio of the inorganic fine particles. When there occurs a difference in refractive index between the base material and the hard coating film, reflected light from an interface between the hard coating film and the lens and reflected light from the surface of the hard coating film interfere with each other to generate an interference fringe. For this reason, it is theoretically preferable that the refractive index of the lens body is equal to the refractive index of the hard coating film.

There is a marked tendency of generating the interference fringe when the refractive index is increased. When the refractive index of the lens body exceeds 1.60, it is necessary to make the refractive index of the hard coating film closer to the refractive index of the lens body.

The second antireflection film is formed by a known deposition method, a known ion sputtering method or the like. As the antireflection film, a multilayer structure film based on an optical theory is employed. As a material, general inorganic oxides such as SiO, $SiO_2$, $Al_2O_3$, $Y_2O_3$, $Yb_2O_3$, $CeO_2$, $ZrO_2$, $Ta_2O_3$, $TiO_2$ and $MgF_2$ are available.

The water-repellent thin film as the third layer is formed by a known deposition method, a known ion sputtering method, a usual dip coating method, a usual spin coating method or the like. The water-repellent thin film is formed by polycondensing an organosilicon compound. The polycondensation makes it possible to increase the thickness of the coating and densify the coating, and the film high in adhesion to the substrate and surface hardness and excellent in dirt wiping property can easily be obtained.

The organosilicon compound before polycondensation is a compound having a silicon-containing functional group represented by $—SiR_yX_{3-y}$ (in which R is a monovalent organic group, X is a hydrolyzable group, and y is an integer of from 0 to 2). Examples of X here include alkoxy groups such as $OCH_3$ and $OCH_2CH_3$, acyloxy groups such as $OCOCH_3$, ketoxime groups such as ON=CRaRb, halogen groups such as Cl and Br, amino groups such as NRcRd (in which Ra, Rb, Rc and Rd each represent a monovalent organic group), and the like.

As the organosilicon compound, a fluorine-containing organosilicon compound is preferable. The fluorine-containing organosilicon compound is excellent in water repellency, oil repellency, electrical insulation, releasability, solvent resistance, lubricity, heat resistance and defoaming property. Especially, a relatively large organosilicon compound having a perfluoroalkyl group or a perfluoropolyether group in a molecule and having a molecular weight of from 1,000 to 50,000 is excellent in antifouling property. AS a commercial product of such an organosilicon compound, for example, Optool DSX (Daikin Kogyo Co., Ltd.) is mentioned.

In the invention, it is an indispensable requirement that pencil hardness of the lens after coating the three layer films in this manner is in the range of from 3H to 7H in terms of scratch hardness (pencil method) according to JIS K 5600-5-4. This is because a rate of crack occurrence is increased whether the pencil hardness is too high or too low.

The hardness of the hard coating film is determined according to the selection of the composition of the hard coating components and the concentrations of the functional groups. Further, the size of the metallic fine particles used, the particle size distribution thereof and the thickness of the hard coating film are also requirements for determining the hardness.

When the pencil hardness is more than 8H, the hardness is increased, but the film becomes too brittle and cracking easily occurs. When the concentration of the functional group which is involved in crosslinking of the components of the hard coating solution is too high, the pencil hardness becomes very high, but cracking easily occurs during heat-curing of the hard coating lens or cracking easily occurs in the antireflection coating. Moreover, when the pencil hardness is more than 8H, cracking is liable to occur in an accelerated exposure test with a weatherometer.

In the invention, the falling angle to oleic acid of the water-repellent thin film as the third layer is 20° or less. When the falling angle is larger than 20°, fingerprint adhesion or antifouling property is worsened, and fingerprint wiping property is also worsened. Especially, a great difference arises with respect to cissing property in writing with oil ink and wiping property thereof. When especially the pencil hardness is low, marring resistance of the third layer tends to be decreased (the falling angle is increased), which is not good for antifouling property and the like. In the foregoing hardness, the falling angle of 20° or less is preferable.

The falling angle here referred to is determined according to the selection of the composition of the components constituting the water-repellent thin film and the concentrations of the functional groups thereof.

The film thickness of the third layer is preferably 1 nm or more, more preferably from 5 nm to 20 nm. When the film thickness is less than 1 nm, properties such as antifouling property, water repellency, oil repellency and electrical insulation tend to be decreased. Meanwhile, when it is more than 20 nm, a problem arises that the color of the antireflection film changes.

A primer film can also be formed in place of the hard coating film as the first layer or as an undercoating film of the hard coating film. The primer film is formed by dipping in a primer solution for coating and then evaporating a solvent by a known method. The hard coating solution is a mixed solution of water or an alcohol solvent, a material such as an acrylic resin, an epoxy resin or a urethane resin and an inorganic oxide fine particle sol. Of these resins, a urethane resin is especially preferable. For example, a urethane resin obtained from an active hydrogen-containing compound selected from alkylene glycols, poly-ε-caprolactones, poly(alkylene carbonates) and silicone polyols and polyisocyanate is mentioned. The film thickness is preferably from 0.5 to 3.0 μm.

When the primer film is formed as the undercoating film of the hard coating film, the primer film is a first layer, the hard coating film a second layer, the antireflection film a third layer, and the water-repellent thin film a fourth layer respectively.

BEST MODE FOR CARRYING OUT THE INVENTION

The invention is illustrated specifically below by referring to EXAMPLES. However, the invention is not limited thereto.

EXAMPLE 1

[Substrate]

0.5 part by weight of 2-diethanolaminoethanol as a catalyst was added to 85 parts by weight of bis(β-epithiopropyl) sulfide and 15 parts by weight of thiophenol at room temperature to form a uniform solution. Subsequently, this solution was injected into a lens mold, followed by deaeration. Polymerization curing was then conducted in an oven at from 10° C. to 120° C. slowly over a period of 22 hours to form a flat lens with 0.00 degree having optical properties of a refractive index of 1.698 and an Abbe number of 36.

[First Layer]

A. Formation of a Primer Film 25 parts by weight of blocked polyisocyanate "Colonate 2529" (Nippon Polyurethane Kogyo K.K.), 18 parts by weight of polyester polyol "Nipporan 1100" (Nippon Polyurethane Kogyo K.K.) and 100 parts by weight of ethyl cellosolve were mixed. To this mixture were added 140 parts by weight of a commercial composite sol of tin oxide and tungsten oxide (methanol dispersion sol, average particle size 10 to 15 nm, tin oxide/tungsten oxide ratio 100 parts by weight/40 parts by weight, solid content 30%) and 0.15 part by weight of a silicone surfactant. They were fully mixed with stirring to obtain a primer solution.

This solution was coated on the surface of the substrate by a dipping method at a draw-up rate of 10 cm/min. The coated lens was dried with air, and heat-cured at 120° C. for 30 minutes to form a primer film having a film thickness of 1.0 µm.

[Second Layer]
B. Formation of a Hard Coating Film 206 g of ethanol, 300 g of a methanol dispersion titania sol (product of Shokubai Kasei Kogyo K.K., solid content 30%), 60 g of γ-glycidoxypropyltrimethoxysilane, 30 g of γ-glycidoxypropylmethyldiethoxysilane and 60 g of tetra-ethoxysilane were added dropwise to a reaction vessel, and a 0.01 N hydrochloric acid aqueous solution was added dropwise to the mixed solution. The mixture was stirred to conduct hydrolysis. Subsequently, 0.5 g of a flow adjustor (L-7604 of Nippon Unica K.K.) and 1.0 g of aluminum acetylacetonate as a curing catalyst were added, and the resulting mixture was stirred at room temperature for 3 hours to form a hard coating solution. This hard coating solution was coated by a dipping method, dried with air, and then heat-cured at 110° C. for 2 hours to form a hard coating film having a film thickness of 2.0 µm.

[Third Layer]
C. Formation of an Antireflection Film

The hard coating lens was put in a vacuum bath where an antireflection treatment was conducted at a substrate temperature of 60° C. by a vacuum deposition method. The film was a five-layer film in which in terms of an optical film thickness, an silicon dioxide layer was λ/4, a zirconium oxide layer 0.5 λ/4, a silicon dioxide layer 0.2 λ/4, a zirconium oxide layer λ/4 and a silicon dioxide layer λ/4 in the order of the lowest layer to the highest layer, in which λ was set at 500 nm.

[Fourth Layer]
D. Formation of a Water-Repellent Thin Film

The lens of the antireflection film was put in a vacuum bath where a water-repellent treatment was conducted by a vacuum deposition method. An organosilicon compound was used as a water repellent. Optool DSX (Daikin Kogyo Co., Ltd.) was vacuum-deposited to form a thin film having a film thickness of 3 nm.

[Results of Evaluation]
The results were summed up in TABLE 1.

EXAMPLE 2

[Substrate]
MR-7, a product of Mitsui Kagaku K.K. was used as a polyurethane substrate using polyisocyanate and polythiol. A solution and B solution thereof were mixed at a mixing ratio instructed by the maker, and a tin-based catalyst was further added, followed by deaeration. This solution was poured into an injection mold, and polymerization curing was then conducted in an oven at from 10° C. to 120° C. slowly over a period of 22 hours to form a flat lens with 0.00 degree having optical properties of a refractive index of 1.67 and an Abbe number of 32.

[First Layer]
A. Formation of a Hard Coating Film

In EXAMPLE 2, no primer film is formed. A coating film having a film thickness of 2.0 µm was formed by the same treatment as in EXAMPLE 1 using the hard coating solution of EXAMPLE 1 as an organosiloxane-based hard coating solution.

[Second Layer]
B. Formation of an Antireflection Film

An antireflection film made of five layers was formed by the same treatment as in EXAMPLE 1.

[Third Layer]
C. Formation of a Water-Repellent Thin Film

The lens of the antireflection film was put in a vacuum bath where a water-repellent treatment was conducted by a vacuum deposition method. A thin film layer was formed using an organosilicon compound KY-8 of The Shin-etsu Chemical Industry Co., Ltd. as a water repellent.

[Results of Evaluation]
The results were summed up in TABLE 1.

EXAMPLE 3

[Substrate]
MR-8, a product of Mitsui Kagaku K.K. was used as a polyurethane substrate using polyisocyanate and polythiol. Mixing was conducted at a mixing ratio instructed by the maker, and a tin-based catalyst was further added, followed by deaeration. This solution was poured into an injection mold, and polymerization curing was then conducted in an oven at from 10° C. to 120° C. slowly over a period of 22 hours to form a flat lens with 0.00 degree having optical properties of a refractive index of 1.60 and an Abbe number of 42.

[First Layer]
A. Formation of a Hard Coating Film

In EXAMPLE 3, no primer film is formed. 206 g of ethanol, 200 g of a methanol dispersion tin-based sol (HIT-30M, manufactured by Nissan Kagaku Kogyo K.K., solid content 30%), 50 g of γ-glycidoxypropyltrimethoxysilane, 30 g of γ-glycidoxypropylmethyldiethoxysilane and 80 g of tetraethoxysilane were added dropwise to a reaction vessel, and a 0.01 N hydrochloric acid aqueous solution was added dropwise to the mixed solution. The mixture was stirred to conduct hydrolysis. Subsequently, 0.5 g of a flow adjustor (L-7604 of Nippon Unica K.K.) and 1.0 g of aluminum acetylacetonate as a curing catalyst were added, and the resulting mixture was stirred at room temperature for 3 hours to form a hard coating solution. This hard coating solution was coated by a dipping method, dried with air, and then heat-cured at 110° C. for 2 hours to form a hard coating film having a film thickness of 2.0 µm.

[Second Layer]
B. Formation of an Antireflection Film

An antireflection film made of five layers was formed by the same treatment as in EXAMPLE 1.

[Third Layer]
C. Formation of a Water-Repellent Thin Film

The lens of the antireflection film was put in a vacuum bath where a water-repellent treatment was conducted by a vacuum deposition method. A thin film layer was formed using as a water repellent the same organosilicon compound KY-8 of The Shin-etsu Chemical Industry Co., Ltd. as in EXAMPLE 2.

[Results of Evaluation]
The results were summed up in TABLE 1.

EXAMPLE 4

[Substrate]

A plastic lens of a diethylene glycol bisallyl carbonate polymer was purchased from Sun Looks K.K., and a flat lens with 0.00 degree having a refractive index of 1.52 was used.

[First Layer]

A. Formation of a Hard Coating Film

In EXAMPLE 4, no primer film is formed. 206 g of ethanol, 396 g of ethanol dispersion colloidal silica ("Oscal 1232", manufactured by Shokubai Kasei Kogyo K.K., solid content 30%), 312 g of a partial hydrolyzate of γ-glycidoxypropylmethoxysilane, 0.2 g of a flow adjustor ("L-7604" of Nippon Unica K.K.) and 86 g of a 0.05 N acetic acid aqueous solution were added to a reaction vessel. The mixture was stirred at room temperature for 3 hours to form a hard coating solution. The hard coating solution was coated by a dipping method, dried with air, and then heat-cured at 110° C. for 2 hours to form a hard coating film having a film thickness of 2.0 μm.

[Second Layer]

B. Formation of an Antireflection Film

An antireflection film made of five layers was formed by the same treatment as in EXAMPLE 1.

[Third Layer]

C. Formation of a Water-Repellent Thin Film

The lens of the antireflection film was put in a vacuum bath where a water-repellent treatment was conducted by a vacuum deposition method. Optool DSX of Daikin Kogyo Co., Ltd. was vacuum-deposited using an organosilicon compound as a water repellent to form a thin film layer having a thickness of 3 nm.

[Results of Evaluation]

The results were summed up in TABLE 1.

EXAMPLE 5

[Substrate]

The same flat lens with 0.00 degree having optical properties of a refractive index of 1.60 and an Abbe number of 42 as in EXAMPLE 3 was used.

[First Layer]

A. Formation of a Hard Coating Film

In EXAMPLE 5, no primer film is formed. The same hard coating solution as in EXAMPLE 4 was coated by a dipping method, dried with air, and then heat-cured at 120° C. for 2 hours to form a hard coating film having a film thickness of 2.0 μm.

[Second Layer]

B. Formation of an Antireflection Film

An antireflection film made of five layers was formed by the same treatment as in EXAMPLE 1.

[Third Layer]

C. Formation of a Water-Repellent Thin Film

The lens of the antireflection film was put in a vacuum bath where a water-repellent treatment was conducted by a vacuum deposition method. An organosilicon compound was used as a water repellent. Optool DSX of Daikin Kogyo Co., Ltd. and a silazane-based water repellent KP-801M of The Shin-etsu Chemical Industry Co., Ltd. were mixed at a ratio of 60:40, and the mixture was vacuum-deposited to form a thin film layer having a thickness of 3 nm.

[Results of Evaluation]

The results were summed up in TABLE 1.

EXAMPLE 6

[Substrate]

The same flat lens with 0.00 degree having optical properties of a refractive index of 1.60 and an Abbe number of 42 as in EXAMPLE 3 was used.

[First Layer]

A. Formation of a Hard Coating Film

In EXAMPLE 6, no primer film is formed. A coating film having a film thickness of 2.0 μm was formed by the same treatment as in EXAMPLE 1 using the hard coating solution of Example 1.

[Second Layer]

B. Formation of an Antireflection Film

An antireflection film made of five layers was formed by the same treatment as in EXAMPLE 1.

[Third Layer]

C. Formation of a Water-Repellent Film

In the same manner as in EXAMPLE 5, Optool DSX of Daikin Kogyo Co., Ltd. and a silazane-based water repellent KP-801M of The Shin-etsu Chemical Industry Co., Ltd. were mixed at a ratio of 60:40, and the mixture was vacuum-deposited to form a thin film layer having a film thickness of 3 nm.

[Results of Evaluation]

The results were summed up in TABLE 1.

EXAMPLE 7

[Substrate]

The same flat lens with 0.00 degree having optical properties of a refractive index of 1.60 and an Abbe number of 42 as in EXAMPLE 3 was used.

[First Layer]

A. Formation of a Primer Film

The primer solution of EXAMPLE 1 was used, and this solution was dip-coated on the substrate at a draw-up rate of 10 cm/min.

The coated lens was dried with air, and heat-cured at 110° C. for 30 minutes to form a primer film having a film thickness of 1.0 μm.

[Second Layer]

B. Formation of a Hard Coating Film

A hard coating film having a film thickness of 2.0 μm was formed by the same treatment as in EXAMPLE 1.

[Third Layer]

C. Formation of an Anti-Reflection Film

An antireflection film made of five layers was formed by the same treatment as in EXAMPLE 1.

[Fourth Layer]

D. Formation of a Water-Repellent Thin Film

Optool DSX (Daikin Kogyo Co., Ltd.) was vacuum-deposited as in EXAMPLE 1 to form a thin film layer having a thickness of 3 nm.

[Results of Evaluation]

The results were summed up in TABLE 1.

TABLE 1

(EXAMPLES)

|  |  | Pencil hardness | Contact angle | Falling angle | Fingerprint adhesion | Antifouling property-1 | Antifouling property-2 | Crack |
|---|---|---|---|---|---|---|---|---|
| EXAMPLE 1 | A. Initial stage | 4 H | 71 | 4 | ⊙ | ⊙ | ⊙ | ○ |
|  | B. After rubbing | 3 H | 68 | 8 | ⊙ | ⊙ | ⊙ | ○ |
|  | C. After weathering | 3 H | 70 | 16 | ○ | ○ | ○ | ○ |
| EXAMPLE 2 | A. Initial stage | 5 H | 69 | 7 | ⊙ | ⊙ | ⊙ | ○ |
|  | B. After rubbing | 5 H | 65 | 10 | ⊙ | ⊙ | ⊙ | ○ |
|  | C. After weathering | 4 H | 68 | 16 | ○ | ○ | ○ | ○ |
| EXAMPLE 3 | A. Initial stage | 5 H | 70 | 8 | ⊙ | ⊙ | ⊙ | ○ |
|  | B. After rubbing | 5 H | 68 | 12 | ⊙ | ⊙ | ⊙ | ○ |
|  | C. After weathering | 5 H | 66 | 14 | ⊙ | ○ | ○ | ○ |
| EXAMPLE 4 | A. Initial stage | 6 H | 70 | 8 | ⊙ | ⊙ | ⊙ | ○ |
|  | B. After rubbing | 6 H | 68 | 10 | ⊙ | ⊙ | ⊙ | ○ |
|  | C. After weathering | 5 H | 66 | 11 | ⊙ | ⊙ | ⊙ | ○ |
| EXAMPLE 5 | A. Initial stage | 7 H | 72 | 20 | ○ | ○ | ○ | ○ |
|  | B. After rubbing | 6 H | 55 | 25 | ○ | ○ | ○ | ○ |
|  | C. After weathering | 6 H | 62 | 27 | ○ | ○ | ○ | Δ |
| EXAMPLE 6 | A. Initial stage | 4 H | 71 | 20 | ⊙ | ○ | ○ | ○ |
|  | B. After rubbing | 3 H | 68 | 25 | ○ | ○ | ○ | ○ |
|  | C. After weathering | 3 H | 70 | 27 | ○ | ○ | ○ | ○ |
| EXAMPLE 7 | A. Initial stage | 3 H | 71 | 4 | ⊙ | ⊙ | ⊙ | ○ |
|  | B. After rubbing | 3 H | 68 | 8 | ⊙ | ⊙ | ⊙ | ○ |
|  | C. After weathering | 3 H | 70 | 16 | ○ | ○ | ○ | Δ |

COMPARATIVE EXAMPLE 1

[Substrate]

The same flat lens with 0.00 degree having optical properties of a refractive index of 1.60 and an Abbe number of 42 as in EXAMPLE 3 was used.

[First Layer]

A. Formation of a Hard Coating Film 206 g of ethanol, 200 g of methanol dispersion tin-based sol ("HIT-30M", manufactured by Nissan Kagaku Kogyo K.K., solid content 30%), 80 g of γ-glycidoxypropyltrimethoxysilane and 80 g of tetraethoxysilane were added dropwise to a reaction vessel, and a 0.01 N hydrochloric acid aqueous solution was added dropwise to the mixed solution. The resulting mixture was stirred to conduct hydrolysis. Then, 0.5 g of a flow adjustor ("L-7604" of Nippon Unica K.K.) and 1.0 g of a catalyst were added, and the mixture was stirred at room temperature for 3 hours to form a hard coating solution. The hard coating solution was coated by a dipping method, dried with air, and then heat-cured at 110° C. for 2 hours to form a hard coating film having a film thickness of 2.0 μm.

[Second Layer]

B. Formation of an Antireflection Film

An antireflection film made of five layers was formed by the same treatment as in EXAMPLE 1.

[Third Layer]

C. Formation of a Water-Repellent Thin Film

The lens of the antireflection film was put in a vacuum bath where a water-repellent treatment was conducted by a vacuum deposition method. A thin film layer was formed using the same organosilicon compound of The Shin-etsu Chemical Industry Co., Ltd. as in EXAMPLE 2 as a water repellent.

[Results of Evaluation]

The results were summed up in TABLE 2.

COMPARATIVE EXAMPLE 2

[Substrate]

The same flat lens with 0.00 degree having optical properties of a refractive index of 1.60 and an Abbe number of 43 as in EXAMPLE 3 was used.

[First Layer]

A. Formation of a Hard Coating Film 206 g of ethanol, 200 g of methanol dispersion tin-based sol ("HIT-30M", manufactured by Nissan Kagaku Kogyo K.K., solid content 30%), 140 g of γ-glycidoxypropyltrimethoxysilane and 20 g of γ-glycidoxypropylmethyldiethoxysilane were added dropwise to a reaction vessel, and a 0.01 N hydrochloric acid aqueous solution was added dropwise to the mixed solution. The resulting mixture was stirred to conduct hydrolysis. Then, 0.5 g of a flow adjustor ("L-7604" of Nippon Unica K.K.) and 1.0 g of aluminum acetylacetonate as a curing catalyst were added, and the mixture was stirred at room temperature for 3 hours to form a hard coating solution. The hard coating solution was coated by a dipping method, dried with air, and then heat-cured at 110° C. for 2 hours to form a hard coating film having a film thickness of 2.0 μm.

[Second Layer]

B. Formation of an Antireflection Film

An antireflection film made of five layers was formed by the same treatment as in EXAMPLE 1.

[Third Layer]

C. Formation of a Water-Repellent Thin Film

The lens of the antireflection film was put in a vacuum bath where a water-repellent treatment was conducted by a vacuum deposition method. A thin film layer was formed using as a water repellent the same organosilicon compound of The Shin-etsu Chemical Industry Co., Ltd. as in EXAMPLE 2.

[Results of Evaluation]

The results were summed up in TABLE 2.

COMPARATIVE EXAMPLE 3

[Substrate]

The same flat lens with 0.00 degree having optical properties of a refractive index of 1.60 and an Abbe number of 42 as in EXAMPLE 3 was used.

[First Layer]

A. Formation of a Hard Coating Film 206 g of ethanol, 200 g of methanol dispersion tin-based sol ("HIT-30M", manufactured by Nissan Kagaku Kogyo K.K., solid content 30%), 100 g of γ-glycidoxypropyltrimethoxysilane and 60 g of γ-glycidoxypropylmethyldiethoxysilane were added dropwise to a reaction vessel, and a 0.01 N hydrochloric acid aqueous solution was added dropwise to the mixed solution. The resulting mixture was stirred to conduct hydrolysis. Then, 0.5 g of a flow adjustor ("L-7604" of Nippon Unica K.K.) and 1.0 g of aluminum acetylacetonate as a curing catalyst were added, and the mixture was stirred at room temperature for 3 hours to form a hard coating solution. The hard coating solution was coated by a dipping method, dried with air, and then heat-cured at 110° C. for 2 hours to form a hard coating film having a film thickness of 2.0 μm.

[Second Layer]

B. Formation of an Antireflection Film

An antireflection film made of five layers was formed by the same treatment as in EXAMPLE 1.

[Third Layer]

C. Formation of a Water-Repellent Thin Film

The lens of the antireflection film was put in a vacuum bath where a water-repellent treatment was conducted by a vacuum deposition method. A thin film layer was formed using as a water repellent the same organosilicon compound of The Shin-etsu Chemical Industry Co., Ltd. as in EXAMPLE 2.

[Results of Evaluation]

The results were summed up in TABLE 2.

COMPARATIVE EXAMPLE 4

[Substrate]

MR-8, a product of Mitsui Kagaku K.K. was used as a polyurethane substrate using polyisocyanate and polythiol. Mixing was conducted at a mixing ratio instructed by the maker, and a tin-based catalyst was further added, followed by deaeration. This solution was poured into an injection mold, and polymerization curing was then conducted in an oven at from 10° C. to 120° C. slowly over a period of 22 hours to form a flat lens with 0.00 degree having optical properties of a refractive index of 1.60 and an Abbe number of 42.

[First Layer]

A. Formation of a Hard Coating Film

A hard coating layer was formed by the same treatment as in EXAMPLE 4.

[Second Layer]

B. Formation of an Antireflection Film

An antireflection film made of five layers was formed by the same treatment as in EXAMPLE 1.

[Third Layer]

C. Formation of a Water-Repellent Thin Film

The lens of the antireflection film was put in a vacuum bath where a water-repellent treatment was conducted by a vacuum deposition method. Optool DSX of Daikin Kogyo Co., Ltd. and a silazane-based water repellent KP-801M of The Shin-etsu Chemical Industry Co., Ltd. were deposited at a weight ratio of 50:50 to form a thin film layer.

[Results of Evaluation]

The results were summed up in TABLE 2.

COMPARATIVE EXAMPLE 5

[Substrate]

A solution and B solution of MR-8, a product of Mitsui Kagaku K.K. were used as a polyurethane substrate using polyisocyanate and polythiol. Mixing was conducted at a mixing ratio instructed by the maker, and a tin-based catalyst was further added, followed by deaeration. This solution was poured into an injection mold, and polymerization curing was then conducted in an oven at from 10° C. to 120° C. slowly over a period 22 hours to form a flat lens with 0.00 degree having optical properties of a refractive index of 1.60 and an Abbe number of 42.

[First Layer]

A. Formation of a Hard Coating Film

A hard coating layer was formed by the same treatment as in EXAMPLE 4.

[Second Layer]

B. Formation of an Antireflection Film

An antireflection film made of five layers was formed by the same treatment as in EXAMPLE 1.

[Third Layer]

C. Formation of a Water-Repellent Thin Film

The lens of the antireflection film was put in a vacuum bath where a water-repellent treatment was conducted by a vacuum deposition method. A thin film layer was formed using a silazane-based water repellent KP-801M of The Shin-etsu Chemical Industry Co., Ltd.

[Results of Evaluation]

The results were summed up in TABLE 2.

COMPARATIVE EXAMPLE 6

[Substrate]

MR-8, a product of Mitsui Kagaku K.K. was used as a polyurethane substrate using polyisocyanate and polythiol. Mixing was conducted at a mixing ratio instructed by the maker, and a tin-based catalyst was further added, followed by degassing. This solution was poured into an injection mold, and polymerization curing was then conducted in an oven at from 10° C. to 120° C. slowly over a period of 22 hours to form a flat lens with 0.00 degree having optical properties of a refractive index of 1.60 and an Abbe number of 42.

[First Layer]

A. Formation of a Hard Coating Film

A hard coating layer was formed by the same treatment as in COMPARATIVE EXAMPLE 2.

[Second Layer]

B. Formation of an Antireflection Film

An antireflection film made of five layers was formed by the same treatment as in EXAMPLE 1.

[Third Layer]

C. Formation of a Water-Repellent Thin Film

The lens of the antireflection film was put in a vacuum bath where a water-repellent treatment was conducted by a vacuum deposition method. A thin film layer was formed using a silazane-based water repellent KP-801M of The Shin-etsu Chemical Industry Co., Ltd.

[Results of Evaluation]

The results were summed up in TABLE 2.

COMPARATIVE EXAMPLE 7

[Substrate]

The same flat lens with 0.00 degree having optical properties of a refractive index of 1.60 and an Abbe number of 42 as in EXAMPLE 3 was used.

[First Layer]

A. Formation of a Hard Coating Film

A hard coating film having a film thickness of 2.0 μm was formed by the same treatment as in EXAMPLE 4.

[Second Layer]

B. Formation of an Antireflection Film

An antireflection film made of five layers was formed by the same treatment as in EXAMPLE 4.

[Third Layer]

C. Formation of a Water-Repellent Thin Film

In the same manner as in EXAMPLE 5, Optool DSX of Daikin Kogyo Co., Ltd. and a silazane-based water repellent KP-801M of The Shin-etsu Chemical Industry Co., Ltd. were mixed at a ratio of 60:40, and the mixture was vacuum-deposited to form a thin film layer having a thickness of 3 nm.

[Results of Evaluation]

The results were summed up in TABLE 2.

(c) Falling Angle

A falling angle was measured at 23° C. and 60% RH using a FACE CA-D type falling angle measuring unit manufactured by Kyowa Kaimen Kagaku K.K. The lens was cut to a size of 3 cm×7 cm, and then installed on a rotary stand. A droplet of oleic acid having a weight of 10 mg was formed using a syringe (diameter of an injection needle—approximately 0.7 mm). The lens was then inclined at a rate of 2°/sec, and an approximate falling angle (presumed falling angle) was measured. Subsequently, a droplet of an artificial fingerprint solution having a weight of 10 mg was moved onto the surface of the optical product in the foregoing manner. Then, the optical product was inclined at a rate of 2°/sec, and the inclination was once stopped before the presumed falling angle. Further, the inclination was conducted at a rate of 0.1°/sec for 10 seconds. At this time, an angle at which the droplet was moved was defined as a falling angle α of the artificial fingerprint solution on the surface of the optical product.

(d) Fingerprint Adhesion

A finger was attached to the surface of the lens, and a degree in which a fingerprint was adhered to the surface of the lens was visually observed.

TABLE 2

(COMPARATIVE EXAMPLES)

| | | Pencil hardness | Contact angle | Falling angle | Fingerprint adhesion | Antifouling property-1 | Antifouling property-2 | Crack |
|---|---|---|---|---|---|---|---|---|
| COMPARATIVE EXAMPLE 1 | A. Initial stage | 8 H | 72 | 15 | ○ | ○ | ○ | ○ |
| | B. After rubbing | 8 H | 57 | 16 | ○ | ○ | ○ | ○ |
| | C. After weathering | 8 H | 70 | 28 | ○ | Δ | ○ | x |
| COMPARATIVE EXAMPLE 2 | A. Initial stage | 2 H | 72 | 15 | ○ | ○ | ○ | ○ |
| | B. After rubbing | 2 H | 57 | 30 | Δ | Δ | Δ | Δ |
| | C. After weathering | 1 H | 70 | 43 | Δ | x | x | Δ |
| COMPARATIVE EXAMPLE 3 | A. Initial stage | 1 H | 72 | 15 | ○ | ○ | ○ | ○ |
| | B. After rubbing | 1 H | 57 | 40 | Δ | x | Δ | x |
| | C. After weathering | F | 70 | 45 | Δ | x | x | x |
| COMPARATIVE EXAMPLE 4 | A. Initial stage | 6 H | 72 | 26 | ○ | Δ | Δ | ○ |
| | B. After rubbing | 5 H | 55 | 32 | Δ | Δ | x | ○ |
| | C. After weathering | 5 H | 62 | 34 | ○ | Δ | x | ○ |
| COMPARATIVE EXAMPLE 5 | A. Initial stage | 6 H | 72 | 45< | ○ | Δ | Δ | ○ |
| | B. After rubbing | 5 H | 55 | 45< | Δ | Δ | x | ○ |
| | C. After weathering | 5 H | 62 | 45< | ○ | x | x | ○ |
| COMPARATIVE EXAMPLE 6 | A. Initial stage | 2 H | 49 | 45< | x | x | x | ○ |
| | B. After rubbing | 2 H | 38 | 45< | x | x | x | x |
| | C. After weathering | 1 H | 46 | 45< | x | x | x | x |
| COMPARATIVE EXAMPLE 7 | A. Initial stage | 6 H | 72 | 22 | ○ | ○ | Δ | ○ |
| | B. After rubbing | 5 H | 55 | 28 | Δ | Δ | Δ | ○ |
| | C. After weathering | 5 H | 62 | 30 | ○ | Δ | Δ | ○ |

Re: Methods for Evaluating Properties (a) Pencil Hardness

Pencil hardness was measured according to JIS K 5600-5-4 General Paint Test Method, Section 5: Mechanical Properties of Coated Films, Chapter 4: Scratch Hardness (Pencil Method)

(b) Contact Angle

A contact angle was measured at 23° C. and 60% RH using a FACE CA-D type contact angle measuring unit manufactured by Kyowa Kaimen Kagaku K.K. A droplet of oleic acid having a weight of 5 mg was formed using a syringe (diameter of an injection needle—approximately 0.7 mm). The droplet was brought into contact with the center of the surface of the lens by raising a sample stand. The droplet of oleic acid was moved onto the surface of the lens, and the contact angle was measured within 30 seconds.

Criteria

○○: Adhesion of a fingerprint is very low

○: Adhesion of a fingerprint is low, and a fingerprint adhered is unnoticeable.

Δ: It is hard to evaluate whether fingerprint adhesion is ○ or x.

x: A fingerprint is adhered to the same extent as in an untreated lens which is not subjected to a water-repellent treatment.

(e) Antifouling Property-1 (Fingerprint Wiping Property)

A fingerprint was adhered to the surface of the lens by pressing a finger thereto, and was then wiped with a tissue paper. At this time, the state was evaluated according to the following criteria.

Criteria

∘∘: A fingerprint is completely wiped by one or two reciprocations.

∘: A fingerprint is completely wiped by three reciprocations.

Δ: A fingerprint is wiped by ten reciprocations.

x: A fingerprint still remains somewhat unwiped even after ten reciprocations.

(f) Antifouling Property-2 (Oil Ink Wiping Property)

The surface of the lens was marked with a twin marker manufactured by The Pilot Pen Co., Ltd., and the ink was wiped with a tissue paper. At this time, the state was evaluated according to the following criteria.

Criteria

∘∘: The ink is completely wiped by one or two reciprocations.

∘: The ink is completely wiped by three reciprocations.

Δ: The ink is wiped by ten reciprocations.

x: The ink still remains somewhat unwiped even after ten reciprocations.

(g) Crack

The surface of the lens was visually observed using a microscope of 20× magnification to measure a state of crack. ∘ to x were determined according to a rule of thumb.

Re: Evaluation of Durability

The foregoing properties were evaluated under the conditions, A. Initial stage, B. After rubbing, C. After weathering.

In a rubbing test, a lens was used which had been rubbed 10,000 times with a scratch tester fitted with a chamois skin under a load of 500 g.

In a weathering test, a lens was used which had been put on a weatherometer and irradiated with ultraviolet light of a predetermined level for 120 hours.

What is claimed is:

1. A plastic lens of a multilayer film structure comprising:
   an organosiloxane-based hard coating film formed on a surface of a lens substrate as a first layer,
   an inorganic oxide-based antireflection film formed on the hard coating film as a second layer, and
   a water-repellent thin film obtained by polycondensing an organosilicon compound and formed on the antireflection film as a third layer,
   wherein a surface of said plastic lens on which said first, second, and third layers are formed has a pencil hardness in a range from 3H to 7H, and an initial falling angle of oleic acid on said surface of said plastic lens is 20 degrees or less.

2. The plastic lens as claimed in claim 1, wherein a primer film is formed between the hard coating film and the lens substrate.

3. The plastic lens as claimed in claim 2, wherein the organosilicon compound constituting the water-repellent thin film is an organosilicon compound having a perfluoropolyether group and having a molecular weight of from 1,000 to 50,000.

4. The plastic lens as claimed in claim 2, wherein the hard coating film is formed by dipping in a hard coating solution containing a curing catalyst.

5. The plastic lens as claimed in claim 2, wherein a lens refractive index of the lens substrate is 1.57 or more.

6. The plastic lens as claimed in claim 2, wherein the film thickness of the hard coating film is from 0.5 to 2.5 μm.

7. The plastic lens as claimed in claim 6, wherein the organosilicon compound constituting the water-repellent thin film is an organosilicon compound having a perfluoropolyether group and having a molecular weight of from 1,000 to 50,000.

8. The plastic lens as claimed in claim 7, wherein a lens refractive index of the lens substrate is 1.57 or more.

9. The plastic lens as claimed in claim 7, wherein the hard coating film is formed by dipping in a hard coating solution containing a curing catalyst.

10. The plastic lens as claimed in claim 9, wherein a lens refractive index of the lens substrate is 1.57 or more.

11. The plastic lens as claimed in claim 1, wherein the film thickness of the hard coating film is from 0.5 to 2.5 μm.

12. The plastic lens as claimed in claim 11, wherein the organosilicon compound constituting the water-repellent thin film is an organosilicon compound having a perfluoropolyether group and having a molecular weight of from 1,000 to 50,000.

13. The plastic lens as claimed in claim 12, wherein the hard coating film is formed by dipping in a hard coating solution containing a curing catalyst.

14. The plastic lens as claimed in claim 13, wherein a lens refractive index of the lens substrate is 1.57 or more.

15. The plastic lens as claimed in claim 1, wherein the organosilicon compound constituting the water-repellent thin film is an organosilicon compound having a perfluoropolyether group and having a molecular weight of from 1,000 to 50,000.

16. The plastic lens as claimed in claim 15, wherein the hard coating film is formed by dipping in a hard coating solution containing a curing catalyst.

17. The plastic lens as claimed in claim 16, wherein a lens refractive index of the lens substrate is 1.57 or more.

18. The plastic lens as claimed in claim 1, wherein the hard coating film is formed by dipping in a hard coating solution containing a curing catalyst.

19. The plastic lens as claimed in claim 1, wherein a lens refractive index of the lens substrate is 1.57 or more.

* * * * *